Sept. 4, 1928.  1,683,497
L. STILES
BEATER
Filed Dec. 27, 1926
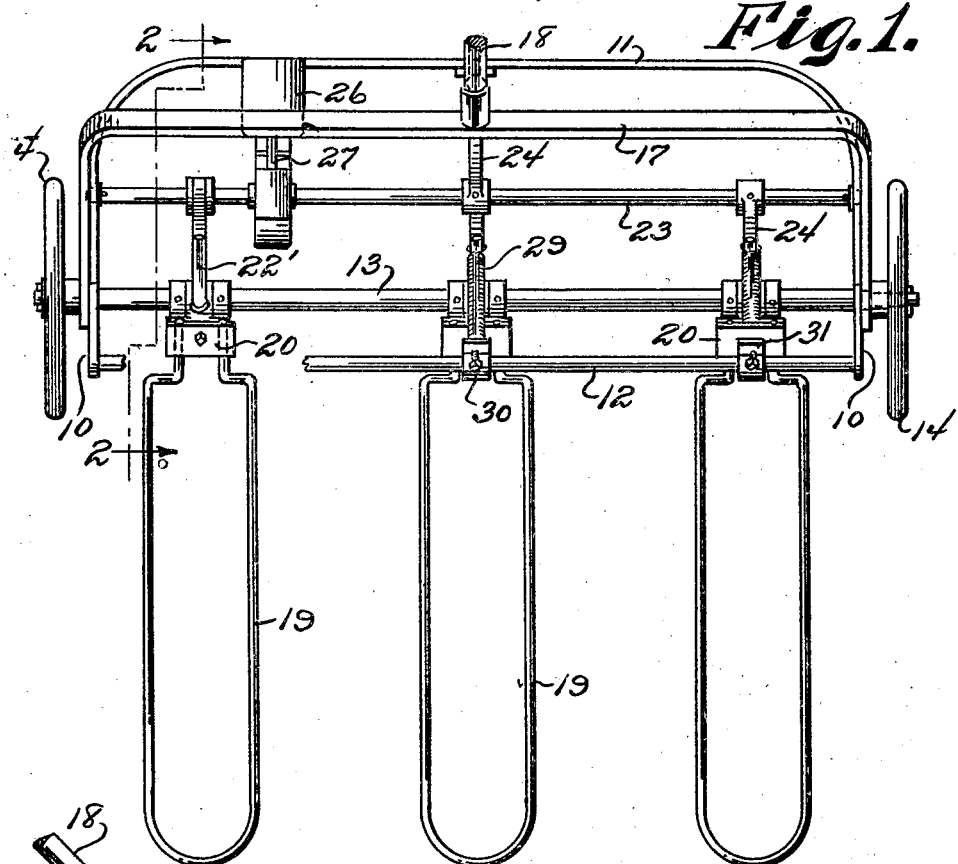
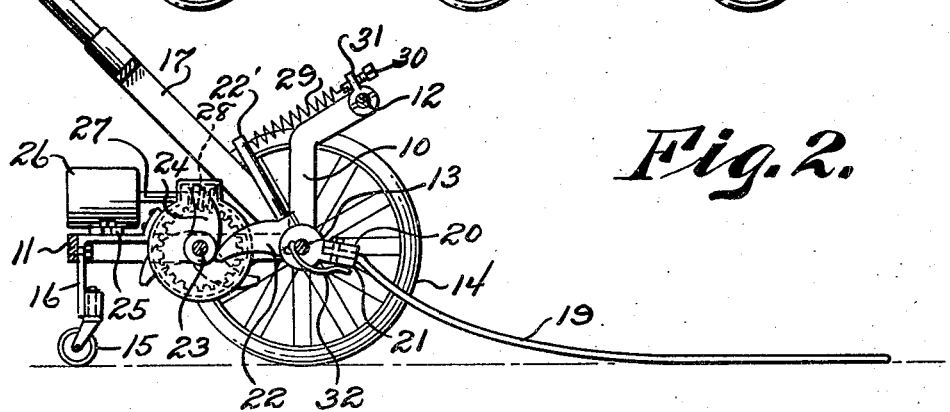
Lorren Stiles
INVENTOR Patented Sept. 4, 1928.

1,683,497

UNITED STATES PATENT OFFICE.

LORREN STILES, OF WOODBURY, NEW JERSEY.

BEATER.

Application filed December 27, 1926. Serial No. 157,297.

This invention relates to improvements in machines for beating carpets, rugs, draperies and so forth, and has for an object the provision of a power operated beater of simple construction, by means of which the operation of beating may be performed in a short time and with a minimum amount of labor.

Another object of the invention is the provision of novel means for mounting, arranging and operating the beater arms of the machine, so that the latter will be independently operated at intervals to effect a sharp quick blow, and will thereafter be immediately moved out of contact with the article acted upon.

With the above and other objects in view, the invention further includes the following novel features and details of construction, to be hereinafter more fully described, illustrated in the accompanying drawings and pointed out in the appended claim.

In the drawings:—

Figure 1 is a plan view of a beating machine constructed in accordance with the invention, with parts broken away.

Figure 2 is a section taken substantially on the line 2—2 of Figure 1.

Referring to the drawings in detail wherein like characters of reference denote corresponding parts, the machine is shown as comprising a frame which includes side members 10 and connecting bars 11 and 12. Mounted in suitable bearings provided in the side members 10 is an axle 13 upon which are mounted wheels 14. A caster wheel 15 is mounted in a suitable bearing arm 16 secured to the bar 11, while extending from the axle 13 at opposite sides of the frame is a yoke 17 from which extends a handle 18. A wheel supported frame is thus provided which may be easily moved over a carpet or other article to be beaten.

The reference character 19 indicates a plurality of beater arms. These arms may be of any suitable construction and have their inner ends clamped as shown at 20, to bearing members 21 which are freely rotatable upon the axle 13. Rigid with these clamping members and also with the arms 19, are fingers 22 which are preferably cam shaped or curved as shown.

Mounted in suitable bearings provided in the side members 10 of the frame is a shaft 23 and fast upon this shaft are cam-shaped fingers 24. One of these fingers is provided for engagement with each of the fingers 22 and the fingers 24 are relatively offset circumferentially of the shafts 23. When the shaft is rotated, the fingers 24 will thus engage the fingers 22 at different intervals, so that the arms 19 will be independently operated at different periods.

Mounted upon a suitable bracket 25 carried by the machine frame is a motor 26. The shaft 27 of this motor is geared to the shaft 23 preferably by means of a worm gearing 28, so that the shaft will be power driven to operate the beaters in the manner just explained.

Each of the fingers 22 has rigid therewith an arm 22' and the latter has connected thereto one end of a spring 29 whose opposite end is connected to an adjusting screw 30 mounted in an arm 31 which extends from the cross bar 12. The springs 29 serve to force the beater arms 19 downward so as to produce a sharp beater stroke when the arms are elevated and released by the action of the fingers 24. Springs 32 which are suitably secured to the axle 13, engage beneath the clamps 21 and act to slightly raise the arms 19 immediately after the said arms complete the beater stroke. This permits of forward movement of the machine without dragging the arms over the carpet or other article acted upon. The springs 32 are of just sufficient tension to effect the operation just mentioned, the tension being overcome by the action of the springs 29 and the momentum of the arms 19 during their downward movement. The tension of the springs 29 and hence the force of the blow of the beater arms may be regulated by means of the adjusting screw 30.

The invention is susceptible of various changes in its form, proportions and minor details of construction and the right is herein reserved to make such changes as properly fall within the scope of the appended claim.

Having described the invention what is claimed is:—

A beater comprising a wheel supported frame including an axle, beater arms mounted for free pivotal movement upon said axle, a finger rigid with each arm, a shaft mounted on the frame, means to rotate the shaft, fingers rigid with the shaft to engage the arm carried fingers for raising said arms and releasing the same when the arms are elevated an appreciable distance, an upwardly inclined finger rigid with each beater arm, arms extending upwardly from the frame at each end of the axle, a bar disposed above the axle and connecting the frame arms, springs having one of their ends connected with the upwardly inclined fingers, and means adjustably connecting the other ends of the springs with the bar to force the arms downward when the latter are released and to regulate the impact of the stroke.

In testimony whereof I affix my signature.

LORREN STILES.